United States Patent [19]

Suzuki et al.

[11] Patent Number: 4,613,490

[45] Date of Patent: Sep. 23, 1986

[54] PROCESS FOR PREPARING SILICON NITRIDE, SILICON CARBIDE OR FINE POWDERY MIXTURE THEREOF

[75] Inventors: Takashi Suzuki; Takamasa Kawakami; Rieko Nakano; Takeshi Koyama; Kansei Izaki; Akira Mori, all of Niigata; Masami Orisaku, Matsudo, all of Japan

[73] Assignee: Mitsubishi Gas Chemical Company, Inc., Japan

[21] Appl. No.: 729,751

[22] Filed: May 2, 1985

[30] Foreign Application Priority Data

| May 8, 1984 | [JP] | Japan | 59-91354 |
| Aug. 3, 1984 | [JP] | Japan | 59-163594 |
| Aug. 7, 1984 | [JP] | Japan | 59-165387 |
| Sep. 3, 1984 | [JP] | Japan | 59-184214 |
| Nov. 26, 1984 | [JP] | Japan | 59-249219 |
| Nov. 27, 1984 | [JP] | Japan | 59-250124 |
| Dec. 4, 1984 | [JP] | Japan | 59-256398 |

[51] Int. Cl.$^4$ ............................................. C01B 33/06
[52] U.S. Cl. .................................................... 423/344
[58] Field of Search ........................................ 423/344

[56] References Cited

U.S. PATENT DOCUMENTS

| Re. 31,447 | 11/1983 | Baney | 423/344 |
| 3,565,674 | 2/1971 | Boland | 423/344 |
| 4,036,653 | 7/1977 | Jacobson | 106/47 |
| 4,073,845 | 2/1978 | Buljan et al. | 264/65 |
| 4,122,155 | 10/1978 | Prochazka et al. | 423/344 |
| 4,298,558 | 11/1981 | Baney | 423/344 |
| 4,314,956 | 2/1982 | Baney | 423/344 |
| 4,405,489 | 9/1983 | Iwai et al. | 423/344 |

*Primary Examiner*—Peter D. Rosenberg
*Attorney, Agent, or Firm*—Leydig, Voit & Mayer, Ltd.

[57] ABSTRACT

Fine silicon nitride powders, fine silicon carbide powders, or fine powdery mixture of silicon nitride and silicon carbide are prepared by vapor phase reaction of an aminosilane compound, a cyanosilane compound, a silazane compound, an alkoxysilane compound or a siloxane compound and heat treatment of the resulting fine powders in a non-oxidizing gas atmosphere.

18 Claims, No Drawings

PROCESS FOR PREPARING SILICON NITRIDE, SILICON CARBIDE OR FINE POWDERY MIXTURE THEREOF

This invention relates to a novel process for preparing silicon nitride, silicon carbide or fine powdery mixture thereof.

Non-oxide-based ceramics such as silicon nitride, silicon carbide, etc. are distinguished in high temperature characteristics such as high temperature strength, high thermal shock resistance, etc., as compared with oxide-based ceramics including alumina as a typical oxide ceramic, and extensive research has been so far made for their processes and applications. Their use as high temperature materials, such as heat-resistant structural materials for gas turbines, diesel engines, heat exchangers, etc. working at a high temperature has been promising.

Silicon carbide as a high temperature material is distinguished in oxidation resistance, mechanical strength and thermal conductivity at a high temperature, and silicon nitride is distinguished in thermal shock resistance, the coefficient of thermal expansion, breaking toughness, etc. Silicon nitride and silicon carbide are processed or molded by sintering, and important factors for producing a high density sintering product are composition, purity, crystal form, particle size, particle shape, etc. of the starting material.

Non-oxide-based silicon ceramics are generally less susceptible to sintering, and thus raw material powders having a good sintering characteristic must have particularly uniform particle sizes of submicron order.

So far, known processes for preparing silicon nitride as a single product include, for example, (1) A process for nitrizing metallic silicon powders by heating at a high temperature in a nitrogen gas or ammonia gas atmosphere.

(2) A process for simultaneously conducting reduction and nitrizing of a mixture of silica powder and carbon in a nitrogen gas atmosphere by heating at a high temperature.

(3) A process comprising reacting silicon tetrachloride with ammonia at the room temperature or a low temperature, isolating the resulting silicon amide or silicon imide, and heating the amide or imide in a nitrogen gas atmosphere or ammonia gas atmosphere at a high temperature, thereby thermally decomposing the amide or imide.

(4) A process for reacting silicon tetrachloride with ammonia in a vapor phase at a high temperature.

However, these processes still have the following problems.

The process (1) is now widely used in the industry, but fine powders are hard to obtain, and the product obtained according to the process (1) must be subjected to prolonged pulverization, resulting in a possibility that impurities such as Fe, Ca, Al, etc. contained in the raw material silicon remain even after the nitrizing or impurities may be introduced into the product during the pulverization.

The process (2) not only requires thoroughly purified silica powders and carbon powders as raw materials, but also the resulting product is a mixture of $\alpha$-type $Si_3N_4$, $\beta$-type $Si_3N_4$, silicon oxynitride, etc. It is also difficult to reduce the particle sizes and also avoid fluctuation in the particle sizes.

The process (3) can be carried out either through a liquid phase reaction or in a vapor phase reaction, and a large amount of ammonium chloride is produced as a by-product together with silicon amide or silicon imide in both liquid phase and vapor phase reactions. Thus, it is troublesome to isolate the product or remove ammonium chloride in the thermal decomposition step, or there is a possibility of corrosion or contamination by impurities from the solvent used. The particle size or crystal type of powders obtained by the thermal decomposition of silicon amide or silicon imide is limitative to making finer particles or uniformly isometric particles.

Among these processes, it is said that the process (4) can produce a high quality product through a vapor phase reaction. However, the reaction of silicon tetrachloride with ammonia proceeds so rapidly that the reaction occurs even at the outlets of the respective feed gas supply pipes, resulting in clogging of the outlets and failure to continue the prolonged operation. Furthermore, there is troublesome removal of ammonium chloride or corrosion problems of the apparatus as in the process (3). Even if ammonium chloride is completely removed, a very small amount of chlorine still remains to convert silicon nitride into $\beta$-crystal in the successive heat treatment step or convert the crystal type into needle form, or further give an adverse effect on the sintering.

So far, known processes for preparing silicon carbide as a single product include, for example, (1) A process for heating a mixture of silica ($SiO_2$) and coke (C) in an Acheson furnace.

(2) A process for solid phase reaction of metallic silicon powders and carbon powders.

(3) A process for solid phase reaction of silica powders and carbon powders.

However, all of these processes have such problems that the raw materials contain involatile metal impurities, which are to be enriched or accumulated in the product, or it is difficult to reduce the fluctuation in the particle size.

Powders of silicon nitride or silicon carbide obtained as a single product according to any one of said processes can be molded and sintered by known technique, such as hot pressing, sintering under the atmospheric pressure, reaction sintering, etc. Processes for preparing composite ceramics having the advantages of silicon nitride and silicon carbide have been also studied, and for example, the following processes have been so far known:

(1) A process comprising mechanically mixing silicon nitride powder with silicon carbide powder, and molding and sintering the mixture by hot pressing.

(2) A process comprising molding a mixture of silicon carbide and silicon in advance, and then subjecting the molded mixture to nitrizing reaction, thereby forming silicon nitride portions, or molding a mixture of silicon nitride and carbon in advance and then subjecting the mixture to silicon permeation, thereby forming silicon carbide portions, both according to a reaction sintering.

(3) A process comprising adding silicon powder to organosilicon polymers as a starting material, molding the mixture, and then subjecting the molded mixture to a nitrizing reaction, thereby forming both silicon carbide portions and silicon nitride portions.

However, these attempts still have the following drawbacks: when the conventional starting material powder is used, there is a limit to thorough control of mixing degree as well as particle characteristics such as particle size, shapes, etc., and also to uniform mixing of the component particles; the starting material powder is liable to be contaminated with impurities owing to the mechanical pulverization and mixing, and a desired satisfactory sintered product may not be obtained; even the reaction sintering may make the sintered product porous, or complicate the steps or operations, or may have a limit to the homogeneity of the composition, and a desired satisfactory sintered product may not be obtained.

SUMMARY OF THE INVENTION

The present invention provides a process for preparing fine silicon nitride powders by:

(1) carrying out vapor phase reaction of an aminosilane compound represented by the following general formula:

$$R_nSi(NR'R'')_m,$$

where R, R' and R'' represent hydrogen atoms, alkyl groups, allyl groups, and phenyl groups, excluding R, R' and R'' being hydrogen atoms at the same time, n=0 to 3, and m=4−n, or a cyanosilane compound represented by the following general formula:

$$R_nSi(CN)_m$$

where R represents a hydrogen atom, an alkyl group, an allyl group, and a phenyl group, n=0 to 3 and m=4−n, or a silazane compound represented by the general formula:

[R R' R'' Si]$_2$NR''', or $$+RR'Si-NR''+_m$$

where R, R', R'', and R''' represent hydrogen atoms, alkyl groups, allyl groups, methylamino groups, and phenyl groups, excluding R, R', R'' and R''' being hydrogen atoms at the same time and n is 3 to 4, in the presence of ammonia, and heat treating the resulting fine silicon nitride powders in an inert gas or non-oxidizing gas atmosphere; or (2) carrying out a vapor phase reaction of an alkoxysilane compound represented by the following general formula:

$$R_nSi(OR')_{4-n},$$

wherein R and R' represent alkyl groups, allyl groups, and phenyl groups, and n=0, 1, 2, or 3, and heat treating the resulting fine powders containing 28.6 to 70% by weight of carbon on the basis of the total powders in a non-oxidizing gas atmosphere including nitrogen and ammonia at a temperature of 1,350° to 1,550° C., or (3) carrying out vapor phase reaction of a siloxane compound free from a halogen substituent together with an inert carrier gas including ammonia, and heat treating the resulting fine powders in a non-oxidizing gas atmosphere.

The present invention provides a process for preparing silicon carbide by:

(4) carrying out vapor phase reaction of an aminosilane compound represented by the following general formula:

$$R_nSi(NR'R'')_m,$$

where R, R' and R'' represent hydrogen atoms, alkyl groups, allyl groups, and phenyl groups excluding R, R' and R'' being hydrogen atoms at the same time and n=0 to 3 and m=4−n, or a cyanosilane compound represented by the following general formula:

$$R_nSi(CN)_m,$$

where R represents a hydrogen atom, an alkyl group, allyl group and a phenyl group, n=0 to 3 and m=4−n, or a silazane compound represented by the following general formula:

[R R' R'' Si]$_2$NR''', or $$+RR'Si-NR''+_m$$

where R, R', R'' and R''' represent hydrogen atoms, alkyl groups, allyl groups, methylamino groups and phenyl groups excluding R, R', R'' and R''' being hydrogen atoms at the same time, and n is 3 or 4 and heat treating the resulting fine powders in a non-oxidizing gas atmosphere, or (5) carrying out vapor phase reaction of a siloxane compound free from a halogen substituent together with an inert carrier gas such as N$_2$, Ar, He, etc., and heat treating the resulting fine powders in a non-oxidizing gas atmosphere, or (6) carrying out vapor phase reaction of an alkoxysilane compound represented by the following general formula:

$$R_nSi(OR')_{4-n},$$

where R and R' represent alkyl groups, allyl groups and phenyl groups, and n is 0, 1, 2 or 3, and heat treating the resulting fine powders containing 37.5 to 70% by weight of carbon on the basis of total powders in a non-oxidizing gas atmosphere.

The present invention provides a process for preparing fine powdery mixture of silicon nitride and silicon carbide by:

(7) carrying out vapor phase reaction of an alkoxysilane compound represented by the following general formula:

$$R_nSi(OR')_{4-n},$$

where R and R' represent alkyl groups, allyl groups and phenyl groups, and n is 0, 1, 2 or 3, and heat treating the resulting fine powders containing 37.5 to 70% of carbon by weight on the basis of the total powders in a non-oxidizing gas atmosphere including nitrogen and ammonia at a temperature of 1,450° to 1,550° C., or (8) carrying out vapor phase reaction of a siloxane compound free from a halogen substituent together with an inert carrier gas including ammonia, where a molar ratio of ammonia as a carrier gas to silicon is 0.1 to 3:1, and heat treating the resulting fine powders in a non-oxidizing gas atmosphere.

In the foregoing processes (1) and (4) according to the present invention, an aminosilane compound, a cyanosilane compound and a silazane compound are used as raw materials, and include, for example, such aminosilanes as (CH$_3$)$_3$Si(NHCH$_3$), (CH$_3$)$_2$Si(NHCH$_3$)$_2$, CH$_3$Si(NHCH$_3$)$_3$, (CH$_3$)Si[N(CH$_3$)$_2$], (CH$_3$)$_2$Si[N(CH$_3$)$_2$]$_2$, (CH$_3$)Si[N(CH$_3$)$_2$]$_3$; such cyanosilanes as (CH$_3$)$_3$SiCN, (CH₃)₂Si(CN)₂, H(CH₃)₂SiCN, H₂(CH₃)SiCN, H(CH₃)Si(CN)₂, H₃SiCN; such silazanes as [HSi(CH₃)₂]₂NH, [(CH₃)₃Si]₂NH, [(CH₃)₃Si]₂NCH₃, ⫿(CH₃)₂Si-NH⫿, [(CH₂=CH)Si(CH₃)₂]NH, ⫿(CH₃)₂Si-NCH₃⫿, ⫿(CH₃)₂Si-NH⫿, and 6-membered cyclic tris(N-methylamino)-tri-N-methyl-cyclotricilazane having an N-methylamino group on the silicon atom as a substituent, represented by the following formula:

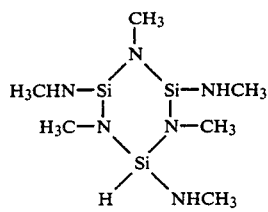

In the foregoing processes (2), (6) and (7), an alkoxysilane compound is used as the raw material, and includes, for example, such alkoxysilanes as tetramethoxysilane, tetraethoxysilane, methyltrimethoxysilane, dimethyldimethoxysilane, and trimethylmethoxysilane.

In the foregoing processes (3), (5) and (8), a siloxane compound free from a halogen substituent is used as the raw material, and includes, for example, siloxane compounds having a linear or cyclic structure such as (CH₃)₃SiOSi(CH₃)₃, (CH₃)₃SiO—Si(CH₃)₂—OSi(CH₃)₃, [(CH₃)₂SiO]₃ and [(CH₃)₂SiO]₄.

I. When silicon nitride is prepared according to the present invention, the raw material is vaporized in advance, then led to a reactor tube, and subjected to vapor phase reaction with a mixture of NH₃ with an inert gas or a non-oxidizing gas such as N₂, H₂, Ar, He, etc. NH₃ is used in a molar ratio of NH₃ to an aminosilane compound, a cyanosilane compound or an silazane compound of preferably 1–50:1, and the lower ratio is not preferable because the product contains much carbon. To use H₂ as an inert carrier gas is effective for discharging the carbon component in the silicon compound to the outside of the system as hydrocarbons such as methane, ethane, etc. through hydrocracking, whereas to use such an inert gas as N₂, Ar or He is important for changing the partial pressure of the raw material vapor in the reaction or for controlling the reaction time.

When silicon nitride is prepared from a siloxane compound as a raw material, NH₃ is used in a molar ratio of NH₃ to silicon of at least 3:1, preferably 3–5:1. A higher ratio is not economically preferable, whereas a lower ratio is not preferable, either, because of an increase in carbon content of fine powders and partial formation of silicon carbide when heat treated.

When the raw material is an alkoxysilane compound, it is not always necessary to use ammonia, but when it is desired to reduce the carbon content of fine powders, it is necessary to use ammonia or a hydrogen gas as a carrier gas together with the raw material.

The vapor phase reaction temperature for preparing fine silicon nitride powders according to the present invention is preferably 800° to 1,500° C. Below 800° C., the reaction fails to proceed satisfactorily, lowering the production rate, whereas above 1,500° C., there will be an apparatus restriction and enormous energy requirements. This is not economical.

The partial pressure of the raw material vapor for preparing fine silicon nitride powders is 0.001 to a few atmospheres, preferably 0.01 to 0.5 atmospheres.

The reaction time is generally 0.01 to 120 seconds, preferably 0.1 to 60 seconds.

When the raw material is, for example, in a liquid state in the preparation of fine silicon nitride powders, a predetermined amount of the liquid raw material is led to a preheater, vaporized and then thoroughly uniformly mixed with predetermined amounts of ammonia and an inert gas or a non-oxidizing gas, and the resulting mixture is led to a reactor tube of external heating type. The reactor tube can be of non-packed or packed pass-through type, where, to obtain uniformity of the resulting fine powders, it is important that the reactor tube has such a structure that the gas can flow without pulsation or turbulence and can be uniformly heated. The resulting fine powders are cooled and led to a collector, which can be of the ordinary type, such as packed bed type, or filter type, or electrostatic precipitator or cyclone type.

When the raw material is an aminosilane compound, a cyanosilane compound, or a silazane compound, the resulting fine silicon nitride powders are amorphous spherical particles in which no peaks are observable by X-ray diffraction, or partially crystallized amorphous spherical particles in which slight peaks are observable by X-ray diffraction, and which have uniform particle sizes of less than 0.5 μm. The fine silicon nitride powders have such a small carbon content that it has no adverse effect on the preparation of ceramics by sintering.

The fine silicon nitride powders can be supplied directly to molding and sintering steps without any additional treatment, but generally are subjected to heat treatment for crystallization.

As the heat treatment atmosphere, an inert gas or a non-oxidizing gas such as N₂, NH₃, H₂, Ar, He, etc. is used. The heat treatment temperature is 1,000° to 1,700° C., preferably 1,200° C. to 1,600° C. The heat treatment time depends on the desired degree of crystallization, and usually 0.5 to 15 hours. Heat treatment procedure is not particularly limited, and usally the heat treatment is carried out by charging the product into a crucible or a pass-through reactor tube, and heating the crucible or the tube while passing the inert gas or the non-oxidizing gas therethrough.

The thus obtained fine crystalline silicon nitride powders have a very high percentage of α-phase, and can be changed to spherical, whisker, or block form, depending on the heating conditions and the atmospheric gas.

When the carbon content is in excess, unreacted carbon powders remain, but can be removed by oxidation at 600° to 850° C. in an oxidizing atmosphere after the heat treatment.

The fine powders obtained from a siloxane compound as a raw material contain oxygen, carbon and silicon as the component elements of the raw material, and furthermore contains nitrogen taken from ammonia. The fine powders are converted to silicon nitride by the successive heat treatment. As the heat treatment atmosphere, a non-oxidizing gas such as Ar, H₂, N₂, and ammonia is used. The oxygen as contained is removed through reduction by the carbon source under the heat treatment conditions. The heat treatment temperature of silicon nitride is 1,350° to 1,850° C., preferably 1,400° to 1,700° C. Below 1,350° C., it is difficult to form silicon nitride, whereas above 1,850° C., the crystal grains grow, resulting in failure of pulverization. Thus, this is not preferable.

The fine powders obtained from an alkoxysilane compound as a raw material are amorphous spherical particles having uniform particle sizes of less than 0.5 μm, in which no peaks are observable by X-ray diffraction, and the fine powders seem to be a mixture of amorphous silica and amorphous carbon, but are spherical particles having particle sizes of less than 0.5 μm, in which carbon and silica seem to be uniformly mixed. The fine powders are converted to silicon nitride by successive heat treatment. As the heat treatment atmosphere, a non-oxidizing gas such as $N_2$, $NH_3$, etc. is used. The heat treatment temperature is 1,000° to 1,700° C., preferably 1,200° to 1,600° C. The heat treatment time depends on the desired degree of crystallization, and usually 0.5 to 15 hours. Heat treatment procedure is not particularly limited, and usually the heat treatment is carried out by charging the product into a crucible or a pass-through reactor tube, and heating the crucible or the tube while passing the non-oxidizing gas therethrough.

The carbon content of fine powders obtained by the vapor phase reaction of an alkoxysilane compound as a raw material and directed to preparation of silicon nitride by heat treatment is preferably 28.6 to 70% by weight on the basis of the total powder. When the carbon content is too small, unreacted $SiO_2$ remains after the heat treatment and silicon oxynitride may be formed. Too larger a carbon content is not particularly inconvenient, but economically not preferable.

The carbon content can be adjusted not only by controlling the reaction temperature and the partial pressure, but also according to the following procedures.

(1) When the carbon content of an alkoxysilane compound is small (for example, in cases of tetramethoxysilane, methyltrimethoxysilane, etc.), hydrocarbon such as benzene, hexane, etc. is added thereto.

(2) When the carbon content of an alkoxysilane compound is large, the carbon content can be adjusted by introducing $H_2$ or ammonia together with an inert gas into the vapor phase reaction.

The thus obtained fine crystalline silicon nitride powders have a very high percentage of α-phase, and can be changed to spherical, whisker, or block form, depending on the heating conditions and the atmospheric gas.

When the carbon content of silicon nitride obtained by heat treatment of fine powders from an alkoxysilane compound and a siloxane compound is in excess, the carbon can be removed by oxidation of carbon nitride at 600° to 850° C. in an oxidizing atmosphere after the heat treatment.

II. When the fine silicon carbide powders are prepared according to the present invention, the following procedure is taken.

In the case of an aminosilane compound, a cyanosilane compound or a silazane compound as a raw material, the raw material is vaporized in advance, and led to a reactor tube together with a non-oxidizing gas such as $N_2$, $H_2$, Ar or He.

A gas such as $N_2$, Ar or He is important in changing the partial pressure of the raw material vapor during the vapor phase reaction, or the reaction time. To use $H_2$ as a carrier gas is effective for discharging the carbon component in the silicon compound to the outside of the system as hydrocarbons such as methane, ethane, etc. through hydrocracking, thereby adjusting the carbon content of the product. The reaction temperature is 800° to 1,500° C. The partial pressure of a raw material vapor and the reaction time are selected in view of the desired particle size, yield, etc. of the product, and usually the partial pressure of a raw material vapor is 0.01 to a few atmospheres and the reaction time is 120 to 0.01 second.

Specifically, a raw material is vaporized and uniformly mixed with a non-oxidizing gas, and the resulting mixture is subjected to vapor phase reaction in a reactor tube of external heating type.

The thus formed fine powders are amorphous spherical particles in which no peaks are observable by X-ray diffraction or partially crystallized amorphous spherical particles in which slight peaks are observable by X-ray diffraction, and which have uniform particle sizes of less than 0.5 μm.

The thus formed fine powders may contain nitrogen, depending on the species of a silicon compound as the raw material or the reaction conditions, and the nitrogen component can be removed by heat treatment in the successive heat treatment step.

The carbon content can be adjusted not only by controlling the reaction temperature and the partial pressure of the raw material vapor, but also by introducing $H_2$ into the reaction. Even after the heat treatment step, free carbon can be removed by oxidation at 600° to 850° C. in an oxidizing atmosphere such as air, etc.

As the heat treatment atmosphere, a non-oxidizing gas such as $N_2$, $H_2$, Ar, He, etc. is used. The heat treatment temperature is 1,350° to 1,850° C., preferably 1,400° to 1,700° C.

When the nitrogen content of the resulting fine powders is large, powders substantially free from the nitrogen component can be obtained by selecting a temperature of 1,550° C. or higher. In the heat treatment in a nitrogen gas atmosphere, a heat treatment temperature of 1,550° C. or higher is selected.

The heat treatment time depends on the desired degree of crystallization, and usually 0.5 to 15 hours. Heat treatment procedure is not particularly limited, and usually the heat treatment is carried out by charging the product into a crucible or a pass-through reactor tube, and heating the crucible or the tube while passing the non-oxidizing gas therethrough.

The thus obtained fine crystalline silicon carbide powders have a very high percentage of β-phase by X-ray diffraction and are fine block powders having less fluctuation in particle sizes of less than 0.5 μm.

When the fine silicon carbide powders are prepared from a siloxane compound as a raw material, an inert carrier gas such as $N_2$, Ar, He, etc. is used. Use of $H_2$ as a carrier gas in the vapor phase reaction is effective for discharging the carbon component in the silicon compound to the outside of the system as hydrocarbons such as methane, etc. through hydrocracking and for adjusting the carbon content of the product.

The partial pressure of the raw material vapor and the vapor phase reaction time in the vapor phase reaction zone depend on the desired particle size and shape of the product, etc., and, for example, the partial pressure is 0.001 to a few atmospheres, preferable 0.01 to 0.5 atmospheres. The reaction time is generally 120 to 0.05 seconds, preferably 60 to 0.1 second. The reaction temperature is generally in a range of 600° to 1,600° C., preferably 800° to 1,500° C.

The reaction is carried out, for example, by vaporizing a siloxane compound as a raw material in advance, mixing the raw material vapor with ammonia and a non-oxidizing gas such as H₂, N₂, etc. uniformly and thoroughly, if necessary, and leading the raw material vapor to a reactor tube of external heating type.

As the atmosphere for heat treating the resulting fine silicon carbide powders, a non-oxidizing gas such as Ar, H₂, N₂, NH₃, etc. is used. The oxygen contained in the fine powder can be removed through reduction by the carbon source under these conditions.

The heat treatment temperature of silicon carbide in the Ar atmosphere is 1,350° to 1,850° C., preferably 1,400° to 1,700° C., and that in the N₂ or NH₃ atmosphere is 1,550° to 1,850° C. The heat treatment time depends on the desired degree of crystallization, and usually is 0.5 to 15 hours. Heat treatment procedure is not particularly limited, and usually the heat treatment is carried out by charging the product into a crucible or a pass-through reactor tube, and heating the crucible or the tube while passing the non-oxidizing gas therethrough.

When silicon carbide is prepared from the fine powders obtained by the vapor phase reaction of an alkoxysilane compound, a preferable carbon content of the fine powders is 37.5 to 70% by weight on the basis of the total powders. When the carbon content is too small, unreacted silicon dioxide remains, and silicon oxynitride is formed, whereas too large a carbon content is not particularly inconvenient, but economically not preferable.

The carbon content can be adjusted not only by controlling the reaction temperature or the partial pressure of the raw material vapor, but also according to the following procedures:

(1) When the carbon content of an alkoxysilane compound is small (for example, in the case of tetramethoxysilane or methyltrimethoxysilane) hydrocarbon such as benzene, hexane, etc. is added as a raw material to the alkoxysilane compound.

(2) When the carbon content of an alkoxysilane compound is large, the carbon content can be adjusted by introducing NH₃ or H₂ together with an inert gas such as Ar, etc. into the vapor phase reaction.

As the heat treatment atmosphere, a non-oxidizing gas such as Ar, H₂, N₂, NH₃, etc. is used. The heat treatment temperature is 1,350° to 1,850° C., preferably 1,400° to 1,700° C. in the H₂ or Ar atmosphere, and 1,550° to 1,850° C. in the N₂ or NH₃ atmosphere.

When the heat treatment temperature is below 1,350° C., silicon carbide is hard to form, whereas above 1,850° C., crystal grains grow and the pulverization becomes impossible. When the non-oxidizing gas atmosphere is N₂ or NH₃ gas, silicon nitride forms below 1,550° C., and thus the heat treatment must be carried out above 1,550° C. The heat treatment time depends on the desired degree of crystallization, and usually is 0.5 to 15 hours. Heat treatment procedure is not particularly limited, and the heat treatment can be carried out by charging the product into a crucible or a pass-through reactor tube, and passing an inert gas therethrough.

In the thus obtained fine crystalline silicon carbide powders, neither SiO₂ nor Si is found, but a very high percentage of β-phase is found present.

When the carbon content of silicon carbide obtained by heat treatment of fine powders from an alkoxysilane compound and a siloxane compound is in excess, the carbon can be removed by oxidation at 600° to 850° C. in an oxidizing gas atmosphere after the heat treatment.

III. When a fine powdery mixture of silicon nitride and silicon carbide is prepared in the present invention, the following procedure is taken. That is, a procedure for vapor phase reaction of an alkoxysilane compound represented by the following general formula:

$$R_nSi(OR')_{4-n},$$

where R and R' represent alkyl groups, allyl groups, and phenyl groups, and n is 0, 1 or 3, is taken.

For example, when the raw material is in a liquid state, a predetermined amount of the liquid raw material is led to a preheater and vaporized, and the resulting raw material vapor is thoroughly and uniformly mixed with predetermined amounts of H₂, NH₃ and an inert gas. The resulting gas mixture is led to a reactor tube of external heating type, which can be of non-packed or packed, pass-through type, where, to obtain uniformity of the resulting fine powders, it is important that the reactor tube has such a structure that the gas can flow without pulsation or turbulence and can be uniformly heated. The resulting fine powders are cooled and led to a collector, which can be of the ordinary type, such as packed bed type, or filter type, or electrostatic precipitor or cyclone type.

The thus obtained fine powders are amorphous spherical particles having uniform particle sizes of less than 0.5 μm, where no peaks are observable by X-ray diffraction.

The carbon content of the thus prepared fine powders is preferably 37.5 to 70% by weight, and when the carbon content is too small, unreacted SiO₂ remains and silicon oxynitride is formed during the heat treatment, whereas too large a carbon content is not particularly inconvenient, but exonomically not preferable.

The carbon content can be adjusted not only by controlling the vapor phase reaction temperature or the partial pressure of the raw material vapor, but also according to the following procedures:

(1) When the carbon content of an alkoxysilane compound is small (for example, in the case of tetramethoxysilane or methyltrimethoxysilane) hydrocarbon such as benzene, hexane, etc. is added as a raw material to the alkoxysilane compound.

(2) When the carbon content of an alkoxysilane compound is large, the carbon content can be adjusted by introducing NH₃ or H₂ together with an inert gas such as Ar, etc. into the vapor phase reaction.

As the heat treatment atmosphere, a non-oxidizing gas such as N₂, NH₃, H₂, etc. is used.

During the heat treatment of the thus prepared fine powders in a non-oxidizing gas atmosphere, the composition (proportion of SiC—Si₃N₄) of the resulting powders can be controlled as desired. When the proportion of silicon nitride is increased, it is preferable to conduct heat treatment in a temperature range of 1,450° to 1,500° C., and below 1,450° C. no formation of silicon carbide is observed and the crystallization rate is also retarded. On the other hand, when the proportion of silicon carbide is increased, a temperature range of 1,500° to 1,550° C. is preferable. Above 1,550° C., no formation of silicon nitride is observable.

The heat treatment time depends on the desired degree of crystallization, and usually is 3 to 10 hours. The heat treatment procedure is not particularly limited, and the heat treatment can be carried out by charging the product into a crucible or a pass-through reactor tube, and passing the non-oxidizing gas therethrough.

When the carbon content is in excess, unreacted carbon powders remain, but can be removed by oxidation at 600° to 850° C. in an oxidizing gas atmosphere after the heat treatment. The thus obtained fine powders have an average particle size of 0.2 μm and a uniform particle size distribution.

To prepare a fine powdery mixture of silicon nitride and silicon carbide by heat treating the fine powders obtained by vapor phase reaction of a siloxane compound in a non-oxidizing atmosphere, the following procedure is taken.

A siloxane compound free from a halogen substituent is vaporized, and subjected to vapor phase reaction together with a non-oxidizing gas as a carrier gas. By supplying the raw material gas together with a non-oxidizing gas such as $NH_3$, $H_2$, $N_2$, Ar, etc. as a carrier gas, not only the partial pressure and feed rate of the raw material vapor can be controlled, but also the carbon content and nitrogen content of the resulting powders can be controlled by selecting the species and mixing ratio of the non-oxidizing gas such as $NH_3$, $H_2$, $N_2$, Ar, etc., and also the composition of the crystalline powders (proportion of silicon carbide-silicon nitride) can be controlled by the successive heat treatment.

In the control of the composition, the ratio of $NH_3$ to be added is particularly important, and generally a molar ratio of ammonia to silicon of 0.1-3:1 is preferable. In a molar ratio below 0.1, it is hard to obtain silicon nitride, whereas in a molar ratio above 3, it is hard to obtain silicon carbide.

According to the present invention, a siloxane compound as a raw material is vaporized in advance, and mixed, if necessary, with $NH_3$ and a non-oxidizing gas such as $H_2$, $N_2$, etc. thoroughly and uniformly, and the resulting gas mixture is led to a reactor tube of external heating type.

The resulting fine powders obtained by the vapor phase reaction contain not only oxygen and carbon as the constituent elements, but also nitrogen, when $NH_3$ is used. The fine powders can be converted to silicon carbide and silicon nitride by the successive heat treatment.

As the heat treatment atmosphere gas, a non-oxidizing gas such as Ar, $H_2$, $N_2$, $NH_3$, etc. is used. The oxygen contained in these atmospheres can be removed by reduction using a carbon source. The heat treatment temperature is 1,350° to 1,850° C., preferably 1,400° to 1,700° C. At a temperature below 1,350° C., it is hard to form crystals, whereas at a temperature above 1,850° C. the crystal grains grow, and the pulverization becomes impossible. The heat treatment time depends on the desired degree of crystallization, and usually is 0.5 to 15 hours.

The heat treatment procedure is not particularly limited, and the heat treatment can be carried out by charging the product into a crucible or a pass-through reactor tube, and passing a non-oxidizing gas therethrough.

When the carbon content is in excess, unreacted carbon powders remain, but can be removed by oxidation at 600° to 850° C. in an oxidizing atmosphere after the heat treatment.

The thus obtained fine powdery mixture has particle sizes of below 1 μm, and also has a uniform particle size distribution.

PREFERRED EMBODIMENTS OF THE INVENTION

Examples 1 to 7

An apparatus comprising a high purity alumina reactor tube, 25 mm in inner diameter and 700 mm long, provided in an electric furnace, and a collector provided at the outlet of the reactor tube was used, and the electric furnace was kept at a predetermined temperature. An aminosilane compound, a cyanosilane compound or a silazane compound, vaporized in a preheater in advance, was thoroughly mixed with $NH_3$ and Ar, and then the mixture was led to the reactor tube, and subjected to vapor phase reaction. It was found by X-ray diffraction that the fine silicon nitride powders collected in the collector were amorphous particles.

Then, the thus obtained fine silicon nitride powders were charged into an alumina tube, and subjected to heat treatment in an Ar gas atmosphere. Table 1 shows the test conditions and the test results.

Examples 8 to 9

In the same apparatus as used in Example 1, silicon nitride was prepared from an alkoxysilane compound as a raw material. Table 2 shows the test conditions and the test results. In Example 9, benzene was vaporized and led to the reactor tube.

Example 10

In the same apparatus as used in Example 1, silicon nitride was prepared from a siloxane compound as a raw material. Table 3 shows the vapor phase reaction conditions, the heat treatment and the properties of silicon nitride.

Examples 11 to 16

The same apparatus as used in Example 1 was used, and the electric furnace was kept at a predetermined temperature. An aminosilane compound, a cyanosilane compound, or a silazane compound as a raw material was vaporized, and mixed with Ar or $H_2$ gas as a non-oxidizing gas thoroughly in advance, and the mixture was led to the reactor tube and subjected to vapor phase reaction.

Fine powders collected in the collector were all uniform, isometric fine particles having particle sizes of less than 0.3 μm. Then, the product was charged into a high purity alumina tube in an inert gas atmosphere, and subjected to heat treatment in an Ar gas atmosphere for 2 to 3 hours in an electric furnace heated at 1,550° to 1,600° C.

Remaining free carbon, if any, was removed by further heat treatment at 600° C. in air. The reaction conditions and analytical results of the resulting powders are shown in Table 4. It was found by X-ray diffraction that there were block crystals of only β-SiC component having particles sizes of less than 0.4 μm. It was found by fluorescent X-ray analysis to determine impurities that contents of Fe, Al, Ca and K were less than 10 ppm, respectively, and the content of Cl was less than 100 ppm.

Chemical analysis showed that 0.2% by weight of nitrogen was contained.

Examples 17-18

The same apparatus as used in Example 1 was used, and the electric furnace was kept at the temperature of 1,200° C. Tetraethoxysilane or tetramethoxysilane vaporized in a preheater in advance was mixed with an Ar gas in the ratio of the former to the latter of 1-2:20 by volume throughly, and the resulting mixture was led to the reactor tube. In Example 18, benzene was vaporized and led to the reactor tube. It was found by the X-ray diffraction that the fine powders collected in the collector were amorphous spherical powders having particle sizes of less than 0.2 μm. Then, the product was charged into an alumina tube and subjected to heat treatment in an Ar gas atmosphere at 1,600° C. for 2 hours. Unreacted carbon was removed by heat treatment in air at 800° C. for 3 hours. It was found by X-ray diffraction that the resulting fine powders were block crystal particles of β-SiC having particle sizes of less than 0.3 μm. The test conditions and the test results are shown in Table 5.

Examples 19–20

In the same apparatus as used in Example 1, silicon carbide was prepared from a siloxane compound as a raw material. Vapor phase reaction conditions, heat treatment conditions and properties of silicon carbide are shown in Table 6.

Examples 21–22

The spherical fine powders prepared from tetraethoxysilane and collected in the collector in Example 17 or from tetramethoxysilane in Example 18, that is, the primary product, was charged into a high purity alumina tube and subjected to heat treatment in a nitrogen gas atmosphere in an electric furnace heated at 1,480° C. Unreacted carbon was removed by heat treatment at 800° C. in air for 3 hours.

The heat treatment conditions and the analytical results of the resulting powders are shown in Table 7. It was found by X-ray diffraction that the powders consisted only of β-SiC and α-$Si_3N_4$, and it was also found by a scanning electron microscope that the powders were block crystal particles having an average particle sizes of 0.2 μm.

Example 23

In the same apparatus as used in Example 1, the electric furnace was kept at 1,200° C.

Hexamethyldicyclohexane was vaporized, and mixed with $NH_3$ and Ar thoroughly, and the resulting mixture was led to the reactor tube, and subjected to reaction, with flow rates of 1 l/hr, 3 l/hr and 15 l/hr.

The fine particles collected in a collector were uniform, isometric fine particles having particle sizes of 0.3 to 0.5 μm.

Then, the product was subjected to heat treatment in an Ar gas atmosphere for two hours in an electric furnace heated at 1,500° C. The excess carbon was removed by further heat treatment at 800° C. in air for 3 hours.

The resulting fine powders are block crystals having particle sizes of less than 0.5 μm, and it was found by X-ray diffraction that the powders consisted only of α-$Si_3N_4$ and β-SiC, whose contents were 14% by weight and 86% by weight, respectively.

TABLE 1

| Ex. No. | Raw material | Vapor phase reaction conditions ||||||
|---|---|---|---|---|---|---|---|
| | | Temp. (°C.) | Time (sec) | Raw Material (vol. %) | $NH_3$ (vol. %) | Ar (vol. %) | $H_2$ (vol. %) |
| 1 | $CH_3Si(NHCH_3)_3$ | 1200 | 1.1 | 7.2 | 20.6 | 72.2 | 0 |
| 2 | $(CH_3)_2Si[N(CH_3)_2]_2$ | 1200 | 2.9 | 5.2 | 56.9 | 37.9 | 0 |
| 3 | $(CH_3)_3SiCN$ | 1380 | 1.8 | 2.8 | 40.6 | 56.6 | 0 |
| 4 | $(CH_3)_2Si(CN)_2$ | 1180 | 1.0 | 1.1 | 7.8 | 91.1 | 0 |
| 5 | +($CH_3)_2Si-NH$]— | 1200 | 1.9 | 1.1 | 6.2 | 41.2 | 51.5 |
| 6 | [($CH_3)_3Si]_2NH$ | 1000 | 1.1 | 4.7 | 43.2 | 52.1 | 0 |
| 7 | +$CH_3(CH_3NH)SiNCH_3$]— | 1200 | 1.2 | 1.0 | 15.3 | 83.7 | 0 |

| Ex. No. | Reaction product || Heat treatment conditions ||| Heat-treated product |||
|---|---|---|---|---|---|---|---|---|
| | Particle size (μm) | C (wt. %) | Temp. (°C.) | Time (hr) | Atmosphere | Shape | α/β | C (wt. %) |
| 1 | <0.4 | 1.8 | 1420 | 10 | Ar | Isometric | 100/0 | 0.5 |
| 2 | <0.2 | 0.9 | 1500 | 1.8 | Ar | needle-like · spherical | 98/2 | 0.3 |
| 3 | <0.2 | 1.9 | 1500 | 2.0 | Ar | needle-like · block | 100/0 | 0.4 |
| 4 | <0.1 | 1.2 | 1500 | 2.0 | Ar | needle-like | 98/2 | 0.3 |
| 5 | <0.1 | 1.4 | 1500 | 2.0 | $N_2$ | needle-like · spherical | 100/0 | 0.1 |
| 6 | <0.3 | 2.0 | 1500 | 2.0 | $N_2$ | needle-like · block | 100/0 | 0.1 |
| 7 | <0.1 | 1.5 | 1500 | 2.0 | $N_2$ | needle-like · block | 100/0 | 0.1 |

TABLE 2

| Ex. No. | Raw material composition ||| Vapor phase reaction condition |||
|---|---|---|---|---|---|---|
| | Silicone compound | Hydrocarbon | Ratio* | Temp. | Time | Si |
| 8 | $Si(OEt)_4$ | — | — | 1200° C. | 3.6 sec | 4.7 wt. % |
| 9 | $Si(OMe)_4$ | benzene | 0.2 | 1200° C. | 3.5 sec | 7.9 wt. % |

| Ex. No. | Reaction product || Heat treatment conditions ||| Heat-treated product ||
|---|---|---|---|---|---|---|---|
| | Particle size | C | Temp. | Time | Atmosphere | Shape | α/β |
| 8 | <0.2μ | 47.4 wt. % | 1480° C. | 2 hr | $N_2$ | Block | 100/0 |
| 9 | <0.1μ | 38.1 wt. % | 1480° C. | 4 hr | $N_2$ | Block | 100/0 |

Remark:
Ratio* = hydrocarbon/silicone compound by weight

TABLE 3

| Ex. No. | Silicone compound | Vapor phase reaction conditions ||||
|---|---|---|---|---|---|
| | | Temp. | Time | Siloxane | $NH_3$ |
| 10 | $[(CH_3)_3Si]_2O$ | 1200° C. | 3.2 sec | 3.25 vol. % | 21.5 vol. % |

| | Heat treatment conditions | Heat-treated product ||
|---|---|---|---|
| | | Shape/ | X-ray |

TABLE 3-continued

| Ex. No. | Temp. | Time | Atmosphere | particle size | diffraction structure |
|---|---|---|---|---|---|
| 10 | 1500° C. | 2 hr | Ar | Block/0.2 μm | α-Si₃N₄ 100% |

TABLE 4

| | Ex. No. | | | | | |
|---|---|---|---|---|---|---|
| | 11 | 12 | 13 | 14 | 15 | 16 |
| Vapor phase reaction conditions | | | | | | |
| Temp. (°C.) | 1200 | 1250 | 1200 | 1200 | 1250 | 1200 |
| Time (sec) | 3.2 | 2.2 | 3.5 | 1.0 | 2.3 | 2.0 |
| Silicone | [(CH₃)₃Si]₂NH | ‒(CH₃)₂SiNH‒ | [HSi(CH₃)₂]₂NH | (CH₃)₃SiCN | CH₃Si(NHCH₃)₃ | ‒CH₃(CH₃NH)SiNCH₃‒ |
| Silicone compound (vol. %) | 9.0 | 2.5 | 4.9 | 4.0 | 2.9 | 2.2 |
| H₂ (vol. %) | — | — | — | 53.6 | — | — |
| Ar (vol. %) | 91 | 97.5 | 95.1 | 42.4 | 97.1 | 97.8 |
| Heat treatment conditions | | | | | | |
| Atmosphere | Ar | Ar | Ar | Ar | Ar | Ar |
| Temp. (°C.) | 1550 | 1550 | 1550 | 1600 | 1600 | 1600 |
| Time (hr) | 3 | 3 | 3 | 2 | 2 | 2 |
| SiC content (wt. %) | >99 | >99 | >99 | >99 | >99 | >99 |

TABLE 5

| | Raw material composition | | | Vapor phase reaction condition | | Reaction product | | Heat treatment condition | | | Heat-treated product | |
|---|---|---|---|---|---|---|---|---|---|---|---|---|
| Ex. No. | Silicone compound | Hydrocarbon | Ratio* | Temp. | Time | Si | Particle size | C | Temp. | Time | Atmosphere | Shape | β-SiC |
| 17 | Si(OEt)₄ | — | — | 1200° C. | 3.6 sec | 4.7 wt. % | <0.2 μm | 47.4 wt. % | 1600° C. | 2 hr | Ar | Block | 100% |
| 18 | Si(OMe)₄ | benzene | 0.2 | 1200° C. | 3.5 sec | 7.9 wt. % | <0.1 μm | 38.1 wt. % | 1600° C. | 2 hr | Ar | Block | 100% |

Remark:
ratio* = hydrocarbon/silicone compound by weight

TABLE 6

| Ex. No. | Silicone compound | Vapor phase reaction conditions | | | |
|---|---|---|---|---|---|
| | | Temp. | Time | Siloxane | NH₃ |
| 19 | [(CH₃)₃Si]₂O | 1200° C. | 3.3 sec | 3.23 vol. % | 0 vol. % |
| 20 | [(CH₃)₃SiO]₄ | 1200° C. | 3.3 sec | 2.80 vol. % | 0 vol. % |

| | Heat treatment conditions | | | Heat-treated product | |
|---|---|---|---|---|---|
| Ex. No. | Temp. | Time | Atmosphere | Shape/particle size | X-ray diffraction structure |
| 19 | 1500° C. | 2 hr | Ar | Block/0.2 μm | β-SiC 100% |
| 20 | 1500° C. | 2 hr | Ar | Block/0.3 μm | β-SiC 100% |

TABLE 7

| | Heat treatment conditions | | | Heat-treated product (shape, content) | | |
|---|---|---|---|---|---|---|
| Ex. No. | Temp. | Time | Atmosphere | Shape | α-Si₃N₄ | β-SiC |
| 21 | 1480° C. | 6 hr | N₂ | Block | 80 wt % | 20 wt % |
| 22 | 1480° C. | 6 hr | N₂ | Block | 85 wt % | 15 wt % |

What is claimed is:

1. A process for preparing fine silicon nitride powders, which comprise carrying out a vapor phase reaction of a silicon compound comprising an aminosilane compound represented by the following general formula:

$$R_nSi(NR'R'')_m$$

where R, R' and R'' represent hydrogen atoms, alkyl groups, allyl groups, and phenyl groups, excluding R, R' and R'' being hydrogen atoms at the same time, n=0 to 3, and m=4−n, or a cyanosilane compound represented by the following general formula:

$$R_nSi(CN)_m$$

where R represents a hydrogen atom, an alkyl group, an allyl group, and a phenyl group, n=0 to 3 and m=4−n, or a silazane compound represented by the general formula:

$$[R\ R'\ R''\ Si]_2NR''', \text{ or}$$

$$\{RR'Si-NR''\}_n$$

where R, R', R'', and R''' represent hydrogen atoms, alkyl groups, allyl groups, methylamino groups, and phenyl groups, excluding R, R', R'' and R''' being hydrogen atoms at the same time, and n is 3 or 4, in the presence of ammonia, and heat treating the resulting fine silicon nitride powders in an inert gas or non-oxidizing gas atmosphere.

2. A process according to claim 1 wherein a molar ratio of the ammonia to said silicon compound is 1-50:1.

3. A process for preparing fine silicon nitride powders which comprises carrying out a vapor phase reaction in a non-oxidizing gas atmosphere including nitrogen and ammonia of an alkoxysilane compound represented by the following general formula:

$$R_nSi(OR')_{4-n}$$

where R and R' represent alkyl groups, allyl groups and phenyl groups, and n=0, 1, 2, or 3, and heat treating the resulting fine powders containing 28.6 to 70%, by weight, of carbon based on the total weight of powders.

4. A process according to claim 3, wherein the heat treatment is carried out at a temperature of 1,350° to 1,550° C.

5. A process for preparing fine silicon nitride powders which comprises carrying out a vapor phase reaction of a siloxane compound free from a halogen substituent together with an inert carrier gas including ammonia in a molar ratio of the inert carrier gas to silicon of 3–5:1, and heat treating the resulting fine powders in a non-oxidizing gas atmosphere.

6. A process for preparing fine silicon carbide powders which comprises carrying out a vapor phase reaction of a silicon compound comprising an aminosilane compound represented by the following general formula:

$$RnSi(NR'R'')_m$$

where R, R' and R' represent hydrogen atoms, alkyl groups, allyl groups, and phenyl groups excluding R, R' and R'' being hydrogen atoms at the same time, and n=0 to 3 and m=4−n, or a cyanosilane compound represented by the following general formula:

$$RnSi(CN)_m$$

where R represents a hydrogen atom, an alkyl group, an allyl group and a phenyl group, n=0 to 3 and m=4−n, or a silazane compound represented by the following general formula:

$$[R\ R'\ R''\ Si]_2NR''', \text{ or}$$

$$\text{\textendash}[RR'Si\text{-}NR'']_n\text{\textendash}$$

where R, R', R'' and R''' represent hydrogen atoms, alkyl groups, allyl groups, methylamino groups and phenyl groups, excluding R, R', R'' and R''' being hydrogen atoms at the same time, and n is 3 or 4, and heat treating the resulting fine powders in a non-oxidizing gas atmosphere.

7. A process for preparing fine silicon carbide powders which comprises carrying out a vapor phase reaction of a siloxane compound free from a halogen substituent together with an inert carrier gas, and heat treating the resulting fine powders in a non-oxidizing gas atmosphere.

8. A process for preparing fine silicon carbide powders which comprises carrying out a vapor phase reaction in a non-oxidizing gas atmosphere of an alkoxysilane compound represented by the following general formula:

$$RnSi(OR')_{4-n}$$

where R and R' represent alkyl groups, allyl groups and phenyl groups, and n is 0, 1, 2, or 3, and heat treating the resulting fine powders containing 37.5 to 70%, by weight, of carbon based on the total weight of powders.

9. A process for preparing a fine powdery mixture of silicon nitride and silicon carbide which comprises carrying out a vapor phase reaction in a non-oxidizing gas atmosphere including nitrogen and ammonia of an alkoxysilane compound represented by the following general formula:

$$RnSi(OR')_{4-n}$$

where R and R' represent alkyl groups, allyl groups and phenyl groups, and n is 0, 1, 2, or 3, and heat treating the resulting fine powders containing 37.5 to 70%, by weight, of carbon based on the total weight of the powders.

10. A process according to claim 9, wherein the heat treatment is carried out at a temperature of 1,450° to 1,550° C.

11. A process for preparing a fine powdery mixture of silicon nitride and silicon carbide, which comprises carrying out a vapor phase reaction of a siloxane compound free from a halogen substituent together with an inert carrier gas including ammonia, where a molar ratio of ammonia as a carrier gas to silicon is 0.1 to 3:1, and heat treating the resulting fine powders in a non-oxidizing gas atmosphere.

12. A process according to claim 11 wherein the heat treatment is carried out at a temperature of 1,350° to 1,850° C.

13. A process according to claim 1 wherein said silicon compound is said aminosilane compound.

14. A process according to claim 1 wherein said silicon compound is said cyanosilane compound.

15. A process according to claim 1 wherein said silicon compound is said silazane compound.

16. A process according to claim 6 wherein said silicon compound is said aminosilane compound.

17. A process according to claim 6 wherein said silicon compound is said cyanosilane compound.

18. A process according to claim 6 wherein said silicon compound is said silazane compound.

* * * * *

UNITED STATES PATENT AND TRADEMARK OFFICE
CERTIFICATE OF CORRECTION

PATENT NO.  : 4,613,490
DATED       : September 23, 1986
INVENTOR(S) : Takashi Suzuki, Takamasa Kawakami; Rieko Nakano;
              Takeshi Koyama; Kansei Izaki; Masami Orisaku It is certified that error appears in the above-identified patent and that said Letters Patent is hereby corrected as shown below:

In reference to:

Column 5, lines 10-19, please correct

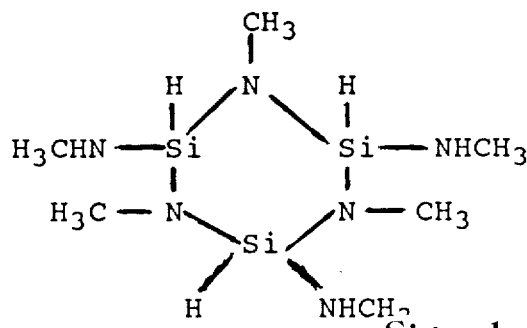

Signed and Sealed this

First Day of August, 1989

Attest:

DONALD J. QUIGG

Attesting Officer

Commissioner of Patents and Trademarks